Figure 1:
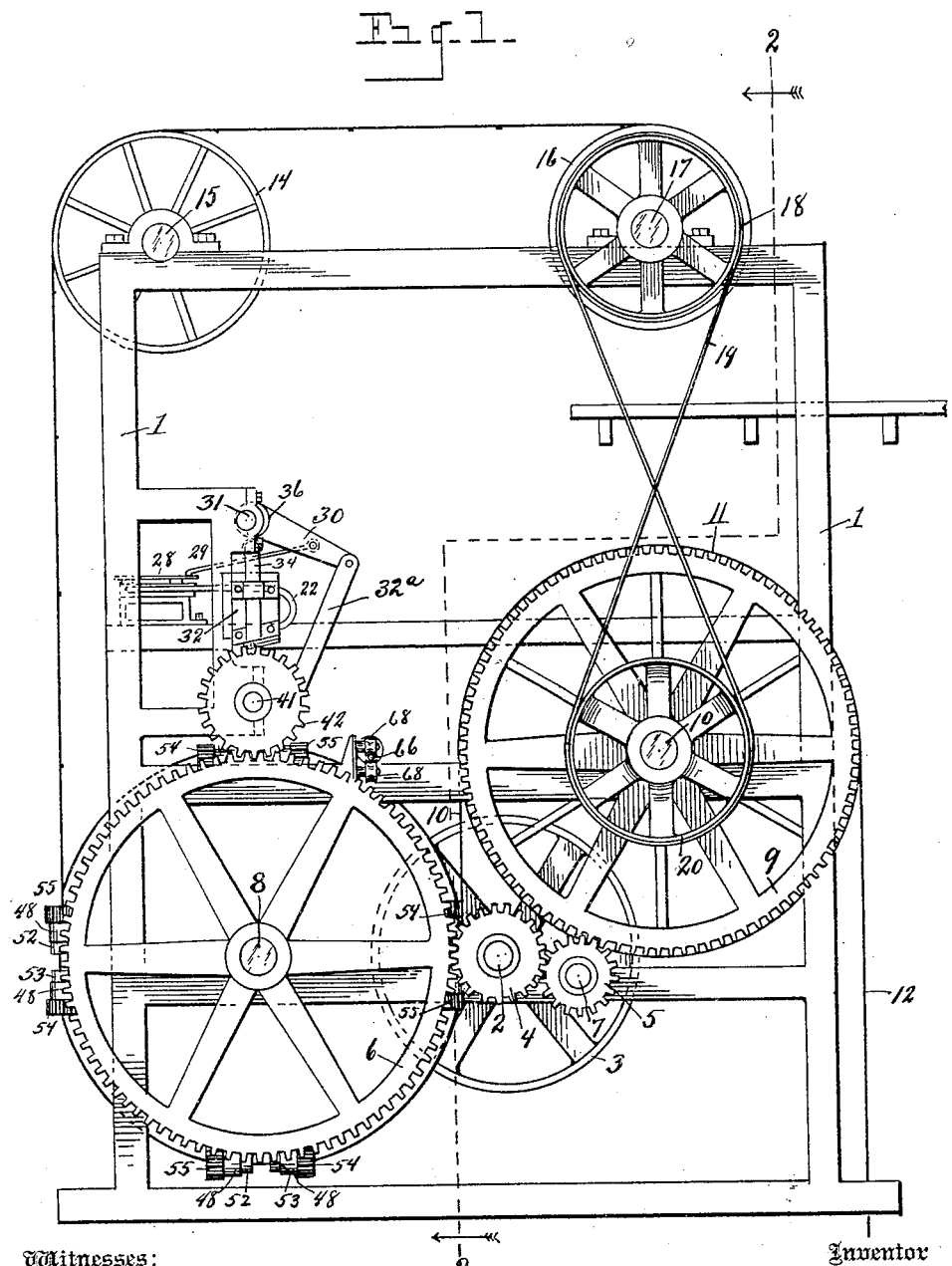

No. 803,711. PATENTED NOV. 7, 1905.
G. A. RAYMOND.
MACHINE FOR MAKING WIRE FABRIC.
APPLICATION FILED JUNE 24, 1904.

7 SHEETS—SHEET 1.

No. 803,711. PATENTED NOV. 7, 1905.
G. A. RAYMOND.
MACHINE FOR MAKING WIRE FABRIC.
APPLICATION FILED JUNE 24, 1904.

7 SHEETS—SHEET 2.

Witnesses:
O. B. Baenziger.
I. G. Howlett.

Inventor
George A. Raymond
By His Attorneys
E. S. Wheeler & Co.

No. 803,711. PATENTED NOV. 7, 1905.
G. A. RAYMOND.
MACHINE FOR MAKING WIRE FABRIC.
APPLICATION FILED JUNE 24, 1904.

7 SHEETS—SHEET 4.

Witnesses:
O. B. Baenziger.
I. G. Howlett.

Inventor
George A. Raymond
By his Attorneys
E. S. Wheeler & Co.

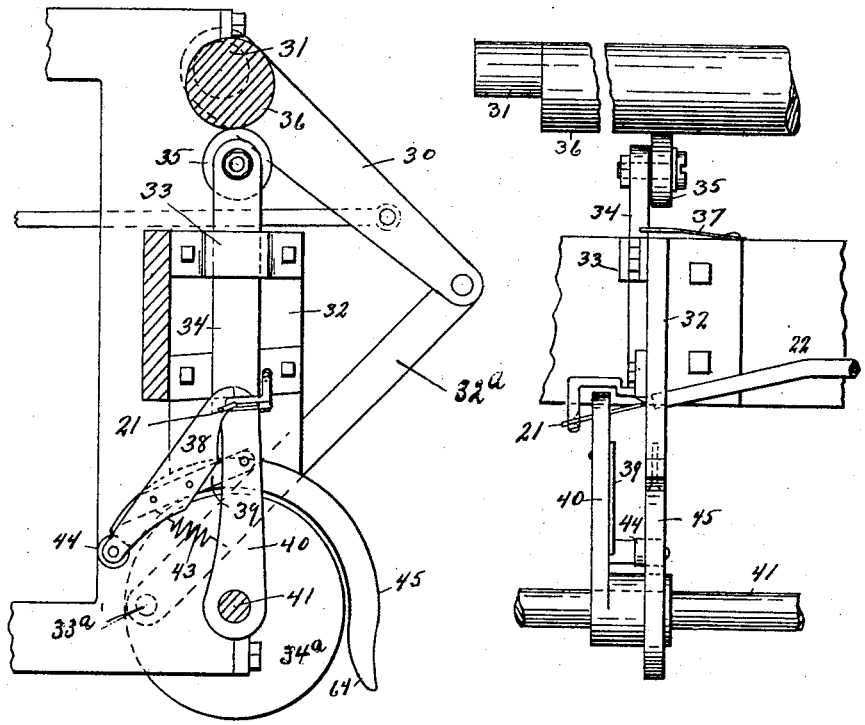
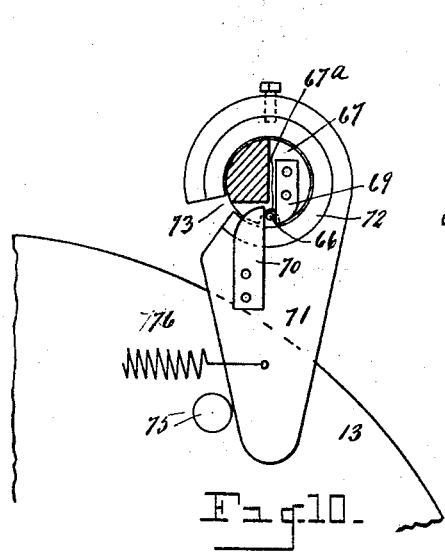
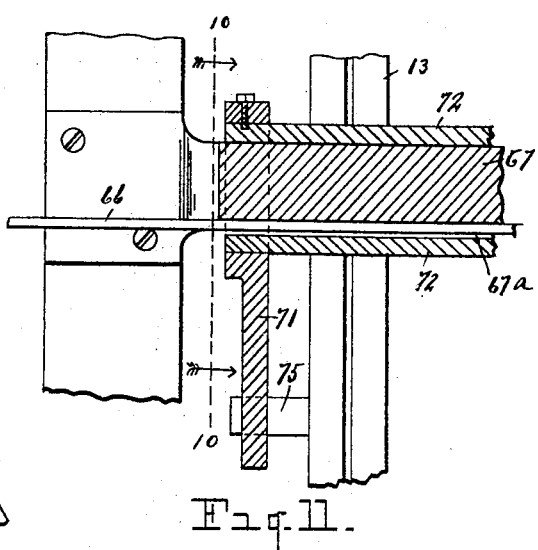

No. 803,711. PATENTED NOV. 7, 1905.
G. A. RAYMOND.
MACHINE FOR MAKING WIRE FABRIC.
APPLICATION FILED JUNE 24, 1904.
7 SHEETS—SHEET 6.
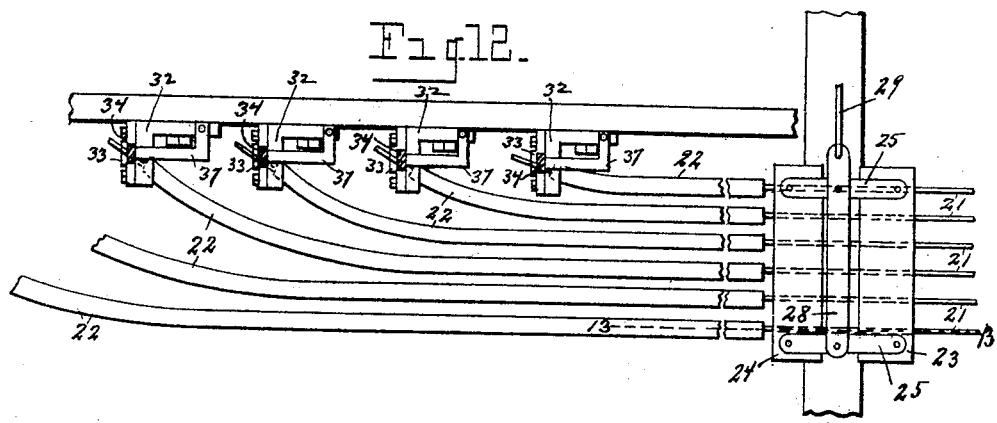
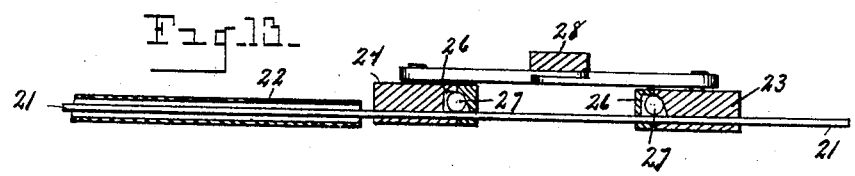
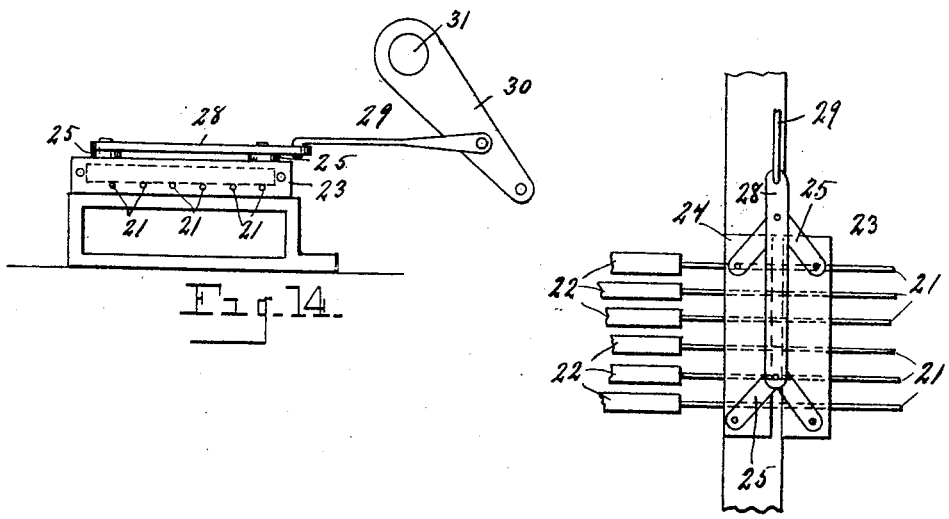
Witnesses:
Inventor
George A. Raymond No. 803,711. PATENTED NOV. 7, 1905.
G. A. RAYMOND.
MACHINE FOR MAKING WIRE FABRIC.
APPLICATION FILED JUNE 24, 1904.

7 SHEETS—SHEET 7.

Witnesses:
O. B. Baenziger
I. G. Howlett

Inventor
George A. Raymond
By His Attorneys
E. S. Wheeler & Co.

UNITED STATES PATENT OFFICE.

GEORGE A. RAYMOND, OF ADRIAN, MICHIGAN, ASSIGNOR OF ONE-HALF TO LEE B. MILLARD, OF ADRIAN, MICHIGAN.

MACHINE FOR MAKING WIRE FABRIC.

No. 803,711.  Specification of Letters Patent.  Patented Nov. 7, 1905.

Application filed June 24, 1904. Serial No. 213,922.

*To all whom it may concern:*

Be it known that I, GEORGE A. RAYMOND, a citizen of the United States, residing at Adrian, in the county of Lenawee, State of Michigan, have invented certain new and useful Improvements in Machines for Making Wire Fabric; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a machine for making wire fabric or fencing of the type known as staple-fencing wherein the cross-wires are attached to the longitudinal wires by means of short tie-wires in the form of staples whose legs are twisted about the wires of the fabric to hold said wires together; and the invention consists in the construction and arrangement of parts hereinafter fully set forth, and pointed out particularly in the claims.

The objects of the invention are to produce a machine of the character described wherein the arrangement is such as to provide for uniting the crossed strands by forming the tie-wires about them without the use of dies or plungers, as ordinarily practiced. A further object is to make the machine continuous in its movement and to provide for automatically supplying the tie-wires to the machine and forcing them into place therein in the form of a staple or loop, so that the crossed strands of the fencing or fabric will lie in and pass through the loop of the staple in a position to be joined when the legs of the staple are wrapped around the longitudinal wire on each side of the stay-wire.

The above objects are attained by the structure illustrated in the accompanying drawings, in which—

Figure 2:
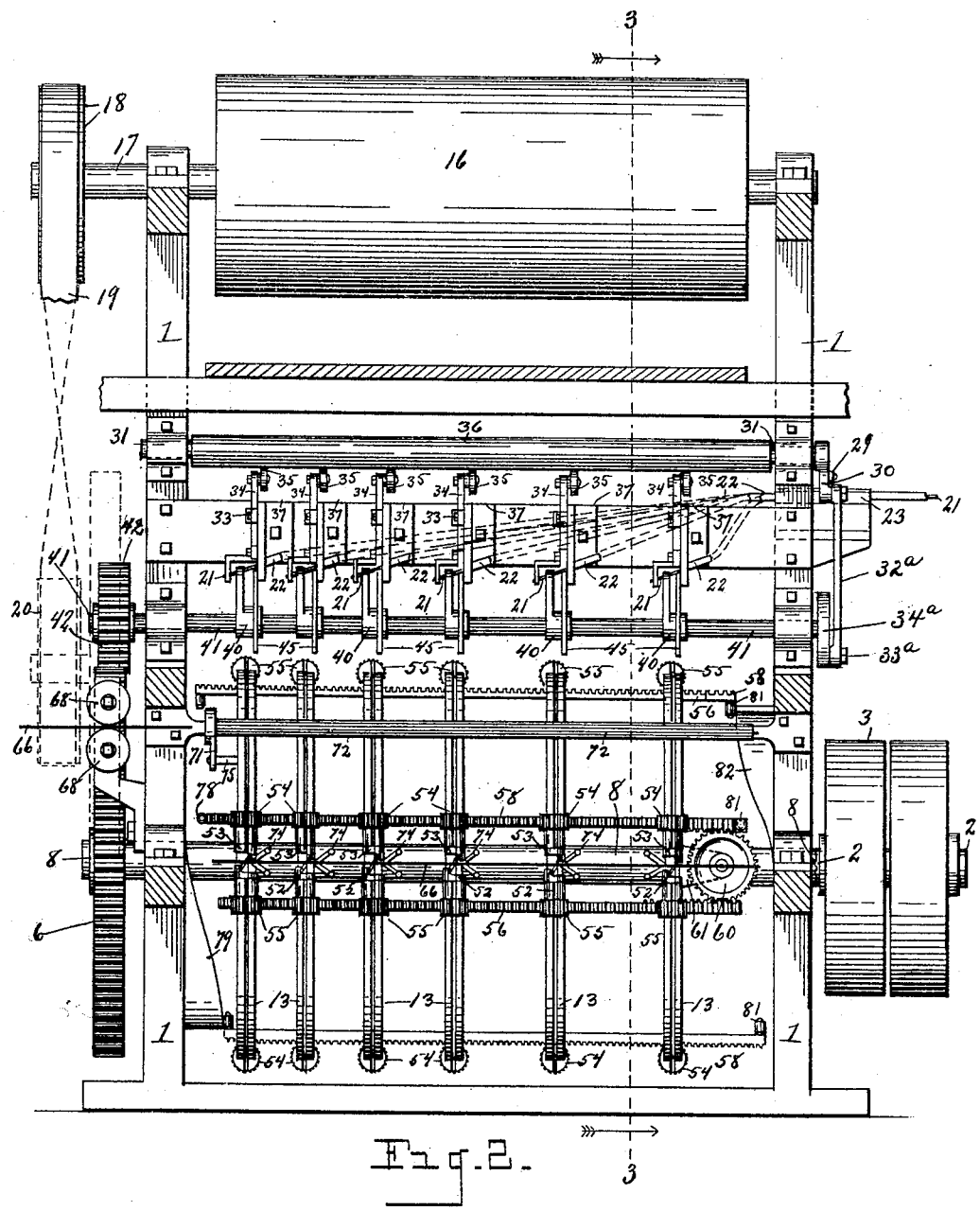
Figure 3:
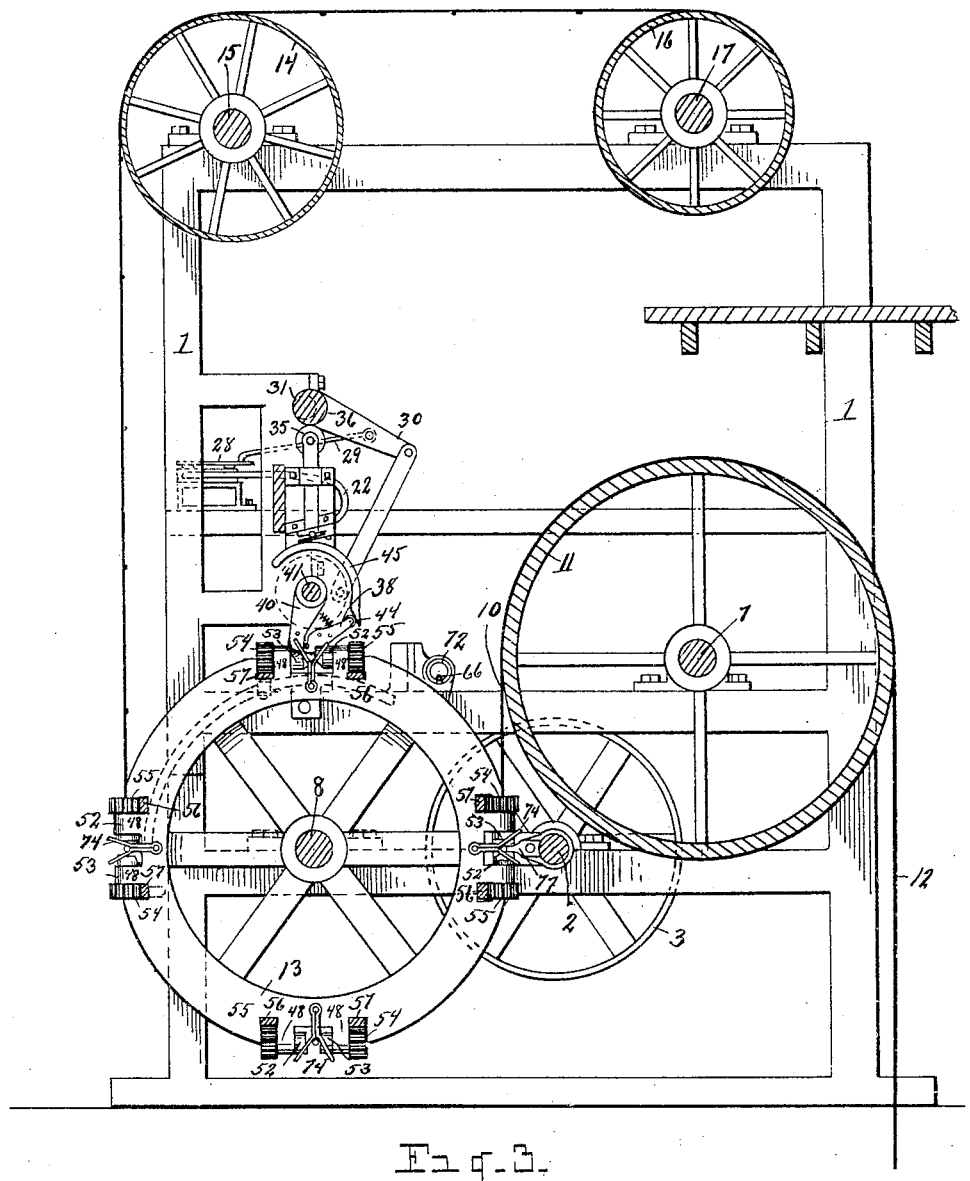
Figures 4, 5:
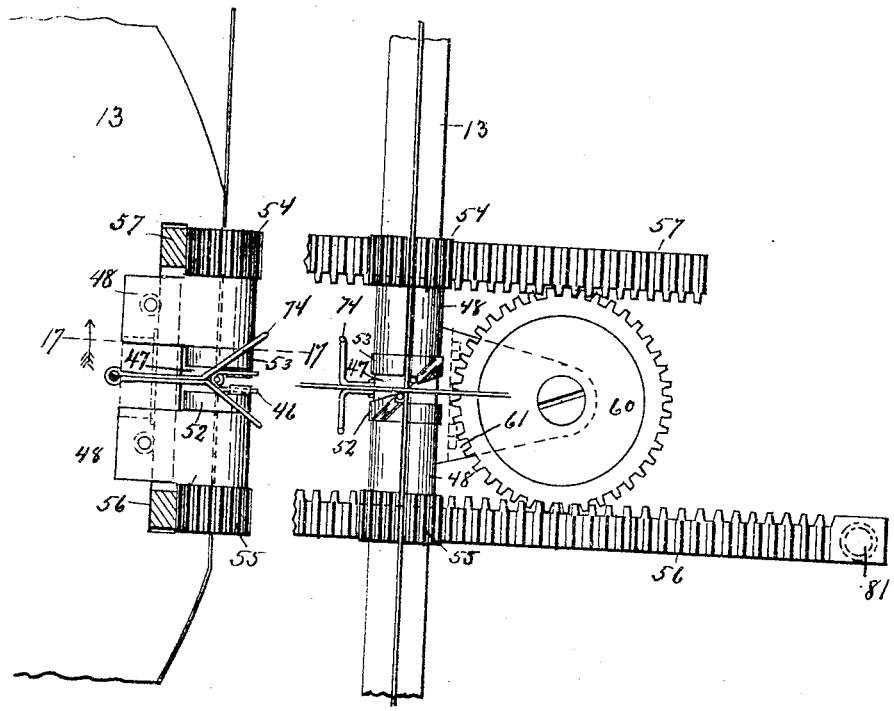
Figures 6, 7:
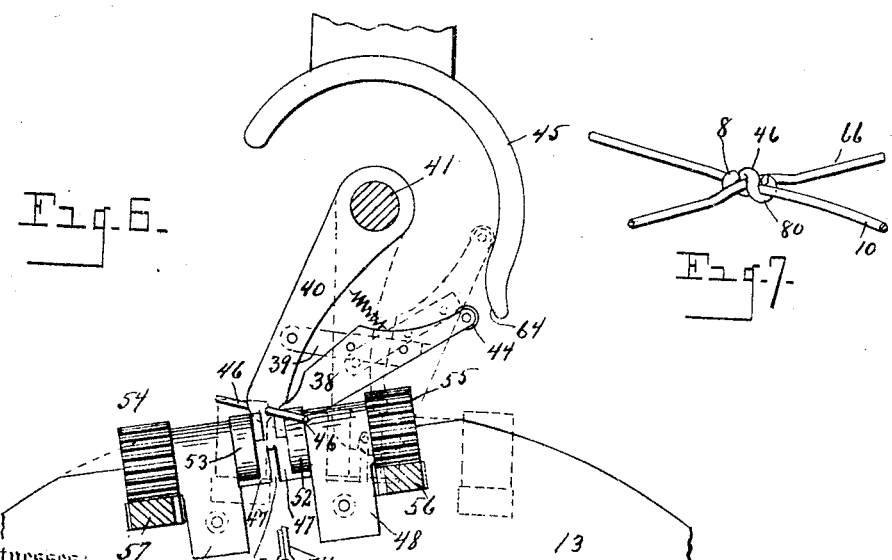
Figure 16:
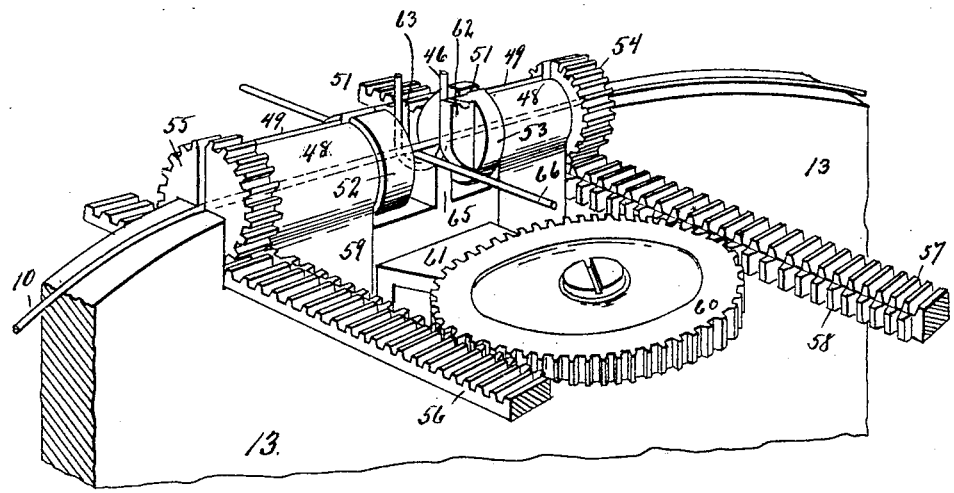
Figure 17:
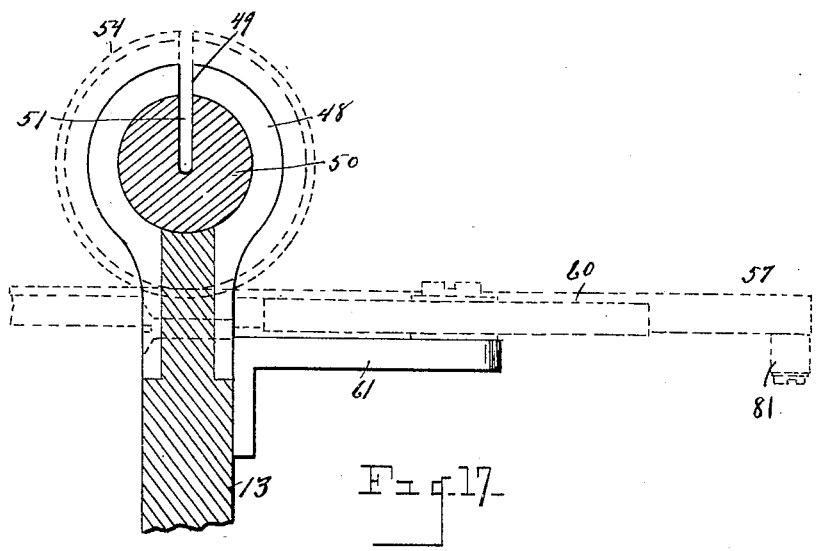

Figure 1 is a side elevation of a machine embodying my invention. Fig. 2 is a vertical longitudinal section through the machine as on line 2 2 of Fig. 1. Fig. 3 is a transverse section through the whole of the machine as on line 3 3 of Fig. 2. Fig. 4 is an elevation of the rotary heads which serve to wrap the legs of the staple around one of the crossed wires of the fabric in the operation of uniting said wires. Fig. 5 is a front elevation of the structure shown in Fig. 4. Fig. 6 is a fragmentary view in elevation of the staple-feeding device through the operation of which the severed strands from which the tying-staples are formed are placed in position in the machine. Fig. 7 is a perspective view of the completed tie which unites the crossed strands of the fabric. Fig. 8 is a detail in elevation of the staple severing and feeding mechanism. Fig. 9 is an elevation, partly in section, of the parts shown in Fig. 8 at right angles thereto. Fig. 10 is a sectional view through the channeled feeding-shaft which receives the transverse wires of the fabric and in which said wires are severed, said view being taken on line 10 10 of Fig. 11. Fig. 11 is a fragmentary view, partly in longitudinal section, through a portion of said shaft and through its embracing oscillatory sleeve, showing a strand of stay-wire therein. Fig. 12 is a fragmentary plan view of the staple-wire feeding-jaws and guiding-tubes which carry the strands of the staple-wires to their respective heads, wherein they are severed preparatory to being fed into the machine. Fig. 13 is a sectional view as on line 13 13 of Fig. 12. Fig. 14 is an elevation of the feeding-jaws. Fig. 15 is a plan view thereof. Fig. 16 is a fragmentary view in perspective of the parts shown in Fig. 5. Fig. 17 is an enlarged transverse section as on line 17 17 of Fig. 14.

Referring to the characters of reference, 1 designates a suitable frame in which the mechanism is mounted. Crossing said frame transversely and journaled therein is the main shaft 2, adapted to be driven by the pulley 3 thereon and carrying at its opposite end a pinion 4, which meshes with a pinion 5 and with the large gear-wheel 6, mounted upon their respective shafts 7 and 8, also journaled in the frame. Pinion 5 meshes with the large gear-wheel 9, mounted on shaft 10, and carrying a drum 11, over which the longitudinal wires 12 are adapted to pass, said wires feeding from said drum onto the grooved wheels 13, mounted upon and turning with the shaft 8, said wheels being so positioned on the shaft 8 as to properly space the longitudinal wires of the fencing or fabric. The operation of fastening the cross-strands of the fabric to the longitudinal strands takes place upon the grooved wheels 13, as hereinafter explained, and the completed fabric passes from said wheels over the drum 14 on the shaft 15, journaled at the top of the frame, and winds onto a drum 16 on the shaft 17, also journaled at the top of the frame, from which latter drum the accumulated fabric is removed from time to time. Motion is imparted to the drum 16 for the purpose of winding up the fabric or fencing through the medium of a pulley 18 on the shaft of said drum, which is driven by a belt 19, running from a pulley 20, on the end of shaft 10. The woof or transverse strands are attached to the warp or longitudinal strands by means of short tie-wires, which are first bent into the form of staples before being secured to the wires of the fabric. These tie-wires are fed into the machine in the form of strands 21, which pass through a number of curved guiding-tubes 22, that direct said strands to the point where the tie-wires are severed therefrom preparatory to being supplied to the machine. The feeding of the strands 21, so that each strand will be carried the same distance by the feeding operation, is accomplished by means of the fixed jaw 23, mounted on the frame, and the movable jaw 24 adjacent thereto and connected by the toggle-levers 25. Passing through said jaws are channels through which the strands 21 pass, and communicating with said channels are recesses 26, having an inclined wall, against which a ball or roller 27 is adapted to lie and at the same time engage the surface of the strands. This arrangement permits the strands to be fed readily through the jaws in one direction, but locks said strands from movement in the opposite direction. Pivoted to the toggle-levers is a cross-bar 28, to which is attached an actuating-rod 29, the opposite end of said rod being pivoted to an oscillatory arm 30, mounted on the rock-shaft 31, whereby through the oscillatory movement of said arm, which movement is imparted as hereinafter explained, the toggle-levers are actuated to successively carry the movable jaw toward and from the fixed jaw, thereby feeding the strands 21 through said jaws and guide-tubes 22. By this arrangement the feeding of all of said strands is made equal and the inner ends thereof are caused to pass through openings in the brackets 32, with which said guide-tubes communicate.

Mounted upon each of the brackets 32 and confined by a guide-plate 33 is a plunger 34, having a lower cutting edge adapted to sever the protruding end of the strand 21 to enable said severed portion to be employed as a tie-wire in uniting the strands of the fabric. Each plunger 34 is provided at its upper end with an antifriction-roller 35, adapted to be engaged by the eccentric portion 36 of the rock-shaft 31, whereby said shaft is rocked through the operation of the arm 30, and the plungers are simultaneously depressed to sever the short sections of tie-wire from the strands 21, said plunger being returned by the springs 37. The necessary reciprocatory movement is imparted to the arm 30 to rock the shaft 31 through the medium of the connecting bar 32$^a$, which is pivoted at one end to said arm and journaled on the crank-pin 33$^a$, projecting from the rotary disk 34$^a$, mounted on the end of the shaft 41, whereby through the rotation of said last-mentioned shaft the arm 30 is reciprocated.

The short pieces severed from the strands 21 by the cutting-plungers 34 are caught and presented to the machine by means of the fingers 38, pivotally connected, by means of the links 39, to the arms 40, fixed to the transverse shaft 41, journaled in the frame and carrying upon one end a pinion 42, which meshes with the gear 6, as clearly shown in Fig. 1, whereby the requisite movement is imparted to the shaft 41 to cause the arms 40 to describe a circle at proper intervals, so that the fingers 38, carried by said arms, may be presented in position to receive the severed ends of the strands 21 at the time of the descent of the plungers 34. The fingers 38 are so mounted on the arms 39 that the ends of said arms and fingers come together in the form of tongs and are held in yielding relation by the compressible springs 43, which are interposed between the outer ends of the fingers and arms, whereby the fingers are made to clamp anything which is engaged between their ends and the ends of the carrying-arms. The fingers are closed and opened through the engagement of the antifriction-rollers 44 in the ends thereof, with the cam-tracks 45 mounted in the path of said fingers. While the rollers 44 are in engagement with said tracks the fingers are held open until the springs 43 will cause the fingers to close upon the severed ends of the strand 21. A further rotation of the shaft 41 will cause the arms 40 to swing downwardly to the position shown in Fig. 6, so that the severed ends of the strands carried by said finger will be presented in proper position to be forced into place in the grooved wheels 13, so as to assume the form of a staple 46, as clearly shown in Fig. 4. To accommodate the staple within the grooved wheel, there is provided an opening 47, in which are placed the opposed bearing-boxes 48, each having a slot 49 therethrough. Journaled in said boxes 48 are the short rotary shafts 50, which are slotted longitudinally, as at 51, and carry upon their inner ends the opposed slotted heads 52 and 53, respectively, through which also pass the slots 51. Upon the opposite ends of said shafts 50 are the slotted pinions 54 and 55, which mesh with the longitudinal movable racks 56 and 57, which are mounted in the grooved wheel to slide laterally thereof.

Upon the inner face of the racks 56 and 57 are the gear-teeth 58 and 59, with which mesh the teeth of the transmitting interposed gear-wheel 60, journaled to a suitable bracket 61, mounted on the side of the wheel 13, whereby a longitudinal movement of one rack will impart a similar movement to the other rack in the opposite direction. Upon the inner face of the slotted heads 52 and 53 are the opposed projecting shoulders 62 and 63, diagonally across which the tie-wire 46 is adapted to lie when presented to said heads by the carrying-arm and finger, as shown in Fig. 6, whereby because of the unsupported center of said tie-wire it is caused to assume a U shape as its central portion is crowded downwardly between said shoulders, as said parts swing together through their respective rotary motions, causing said tie to lie between said heads with the shoulder 63 of head 52 engaging the outside of one leg and the shoulder 62 of head 53 engaging the outside of the opposite leg, the tie standing in the form of a staple between said heads. At the time the staple is deposited in this position the antifriction-roller 44 at the outer end of the finger 38 will engage the outwardly-curved end 64 of the cam 45, thereby forcing said end of the finger inwardly and swinging it upon the pivotal link 39 to cause it to open, as shown by dotted lines in Fig. 6, and free the staple-wire, in which open position said finger remains until a further rotation of the arm 40 carries it upwardly into position to again receive the severed end of a succeeding length of the tie or staple wire, as shown in Fig. 9, when the roller will pass from the end of the cam-track 45 and allow the spring 43 to swing the finger upon the pivotal link to close it upon said severed portion and carry it by a further rotation of said arm to present the staple-wire to the succeeding set of rotary heads in the disk 13 as said heads are brought into position by the rotation of said disk. As the staple is forced into position between the rotary heads its loop portion is supported upon the central stud 65, whereby it is firmly held in position to receive the woof or transverse wire 66, which is dropped between the legs thereof. The transverse wire, as will be understood, is received between the legs of all of the staples held between the rotary heads in a single row and is presented to and across the loop of said staples from a transversely-extending bar 67, having a channel 67ª, into which the transverse wire 66 is fed by means of the feeding-rollers 68, mounted upon the frame of the machine at one end and driven from any suitable source of power. After the transverse wire has been fed into said channeled bar it is severed through the operation of the shearing-knives 69 and 70, of which the knife 69 is mounted on the bar 67 and of which the knife 70 is mounted on a depending arm 71, fastened to the end of a rotary sleeve 72, which embraces the fixed bar 67 and is adapted to rock or reciprocate thereon, said sleeve having a longitudinal slot 73 therein which by the movement of the arm 71 in the operation of shearing the transverse wire 66, which lies between said knives, is caused to register with the channel of the bar, so that the severed wire is permitted to fall through the slot in the sleeve into and across the staples 46, lying between the series of the rotary heads 52 and 53. To direct the severed transverse wire properly across said staples between the rotary heads, there are employed guiding-fingers 74, which are fastened to the face of the wheels 13 and are made to diverge at their outer ends, so as to receive and direct the transverse wires properly into place, as clearly shown in Figs. 4 and 5.

The channel-bar 67 and its embracing rotary sleeve are so positioned as to discharge the transverse strands into the machine just after the staples have been placed in position through the operation of the carrying-arms, and the arm 71 on said sleeve is actuated to cause the knives to sever the strand and bring the slot 73 in said sleeve into alinement with the channel in said bar to discharge the severed wire by means of a pin 75, which projects from the face of the outer of the wheels 13 and engages the arm 71, whereby it is swung to actuate the sleeve and severing-knife, as stated. To return the arm and sleeve after said arm has been carried to the limit of its movement by the pin 75, there is employed a spring 76, (shown in Fig. 10,) one end of which is attached to said arm and the other end to a fixed support, whereby the arm is retracted after a strand has been severed and returned into position for a succeeding operation.

After the transverse wires 66 have been fed into the machine across the staples the longitudinal wires 10 are fed from the drum 11 onto the grooved wheels 13, so as to cross the transverse wires 66 between the legs of the staples, as clearly shown in Fig. 16, said wires lying in the slots 51 in the rotary shafts 50 and passing through the heads 52 and 53 and the pinions 54 and 55 upon the ends of said shafts, said wires being held in said slotted shafts by the tension which is exerted thereon in drawing them from said drum onto the grooved wheels. To provide for crimping the crossed wires at their junction, there are employed the arms 77, (see Fig. 3,) which are fixed to and turn with the shaft 2 and are so timed in their movement as to swing into the opening between the rotary heads 52 and 53 at the time when the movement of the grooved wheels shall have carried the staples into horizontal alinement with the shafts 2 and 8, whereby sufficient pressure is exerted by the arms 77 to crimp the crossed wires at the point where they lie across the loop of the staples. After this crimping process the legs of the staples are wrapped around the longitudinal wires on each side of the transverse wires by means of the staples on opposite sides. The necessary movement is imparted to said heads to cause them to rotate through the engagement of the antifriction-roller 78 on the end of rack 58 with the inclined track 79, fixed to the frame and projecting into the path of said roller, whereby said rack 58 is moved longitudinally such distance as to turn the rotary heads 53 through the engagement of said rack with the pinions 54 and wrap one leg of the staples around the longitudinal wires at the same time the rack 56 is moved in the opposite direction through the rotation of the transmitting-wheel 60, whereby the heads 54 are rotated in the opposite direction through the engagement of the pinions 55 with said rack 56, whereby the opposite legs of the staples are wound around the transverse wire in the opposite direction, the length of the legs of the staples 46 being such as to form eyes 80, which embrace the longitudinal wire on each side of the cross-wire, as clearly shown in Fig. 7. After said heads have been rotated to wind the legs of the staples around the longitudinal wires the racks are restored to their normal position by the engagement of the antifriction roller 81 on the opposite end of rack 5 with the inclined track 82, attached to the opposite end of the frame in the path of said roller, whereby the racks are shifted to restore the rotary heads to their normal position for a succeeding operation, the movement of said racks being such as to always present the slots 51 in the rotary shaft 50 in alinement with the slots 49 in the boxes in which said shafts turn, so that after the legs of the staple have been wrapped about the longitudinal wires to secure the crossed wires together the shafts 50 are rotated to present their slots in position to again receive the longitudinal wires as the grooved wheels continue to revolve.

In the operation of this machine no staple-making device is necessary, as the strands from which the tying-staples are formed are presented to the machine in straight lengths and are looped into the form of staples and carried between the rotary heads by the feeding-fingers, in which position they are maintained by their own tension until the wires are crossed between the legs thereof, when said legs are wrapped around the crossed wires to unite them, as described.

The laterally-movable racks being common to all of the pinions which drive the rotary heads, said heads are actuated in unison to wrap the legs of all of the staples that secure a single bar simultaneously, and because of the fact that the movement of the machine is continuous rather than intermittent and may be run at a comparatively high rate of speed its capacity is very high.

Having thus fully set forth my invention, what I claim as new, and desire to secure by Letters Patent, is—

1. In a machine for making wire fabric, the combination of the means for introducing the tie-wires and forming them into loops, means for feeding the longitudinal wires into the machine to lie in the loops of the tie-wires, means for introducing the transverse wires across the longitudinal wires in the loops of the tie-wires, and means for wrapping the ends of the tie-wires around the longitudinal wires in opposite directions.

2. In a machine for making wire fabric, the combination with the rotary wheels adapted to receive the longitudinal wires, means for feeding the tie-wires to said wheels and looping said tie-wires, means for introducing the transverse wires through the loops of the tie-wires, means for directing the longitudinal wires through the loops of the tie-wires across the transverse wires, and means for wrapping the ends of the loop around one of the crossed wires.

3. In a machine for making wire fabric, the combination of the rotary agents carrying the tying mechanism, means for introducing the tie-wires to said rotary agents in short straight lengths and forming said tie-wires into loops, means for introducing the transverse wires through the loops of the tie-wires, means for directing the longitudinal wires through the loop of the tie-wires across the transverse wires, and means for wrapping the terminals of said loops around one of the crossed wires in opposite directions.

4. In a machine for weaving wire fabric, the combination with the rotary agents adapted to receive the longitudinal wires, rotary heads in said agents through which the longitudinal wires are adapted to pass, means for presenting the tie-wires to said rotary agents and looping said tie-wires between said rotary heads which engage the terminals thereof, means for introducing the transverse wires through the loops of the tie-wires, means for introducing the longitudinal wires through the loops of the tie-wires across the transverse wires, and means for rotating said heads to wrap the terminals of the loop around one of the crossed wires.

5. In a machine for weaving wire fabric, the combination with the grooved wheels adapted to receive the longitudinal wires, rotary heads in said wheels, slotted to also receive said wires, means for introducing the tie-wires in short straight lengths between said rotary heads and looping said tie-wires, means for introducing the transverse and longitudinal wires through the loops of the tie-wires, gears for driving said rotary heads, racks for driving said gears, and means for operating said racks.

6. In a machine for weaving wire fabric, the combination of the rotary grooved wheels around which the longitudinal wires are adapted to pass, opposed slotted rotary heads mounted in said wheels, means for severing the tie-wires, presenting them in straight lengths to the rotary heads and looping said tie-wires between said heads, slotted pinions for driving said heads, reciprocatory racks engaging said pinions, means for introducing the longitudinal and transverse wires through the loops of the tie-wires, the longitudinal wires passing through the slotted heads and pinions, means for shifting said racks to rotate said heads and wind the terminals of the loops around the crossed wires.

7. In a machine for weaving wire fabric, the combination of the rotary wheels adapted to receive the longitudinal wires, of the slotted rotary heads through which said wires are adapted to pass, the rotary feeding-arm adapted to present the tie-wires between said rotary heads in the form of loops, means upon said heads for engaging the terminals of the tie-wires, means for introducing the transverse and longitudinal wires through the loops of the tie-wires, and means for rotating said heads in opposite directions to wrap the terminals of the tie-wires around one of the crossed wires.

8. In a machine for weaving wire fabric, the combination with the rotary wheels adapted to receive the longitudinal wires, of the slotted rotary heads through which said wires pass, means for severing the tie-wires, carrying-arms and fingers adapted to engage the severed tie-wires and present them between said rotary heads, means for actuating said fingers to cause them to engage and release said wires, means for introducing the longitudinal and transverse wires through the loops of said tie-wires, and means for rotating said heads to wrap the terminals of the tie-wires around the crossed wires.

In testimony whereof I sign this specification in the presence of two witnesses.

GEORGE A. RAYMOND.

Witnesses:
R. B. ROBBINS,
EMMA RAYMOND.